Sept. 29, 1925.

E. DANNER

METHOD AND APPARATUS FOR MAKING SHEET GLASS

Original Filed July 14, 1920    8 Sheets—Sheet 6

INVENTOR
Edward Danner,
By Owen, Owen & Crangton,
His attys.

Patented Sept. 29, 1925.

1,555,358

UNITED STATES PATENT OFFICE.

EDWARD DANNER, OF TOLEDO, OHIO.

METHOD AND APPARATUS FOR MAKING SHEET GLASS.

Application filed July 14, 1920, Serial No. 396,339. Renewed July 5, 1922. Serial No. 572,959.

*To all whom it may concern:*

Be it known that I, EDWARD DANNER, a citizen of the United States, and a resident of Toledo, in the county of Lucas and State of Ohio, have made an invention appertaining to Method and Apparatus for Making Sheet Glass; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to the manufacture of sheet glass and particularly to simple and efficient means for practicing the process described in my former U. S. Letters Patent, No. 1,261,366, issued April 2nd, 1918, for forming molten glass in continuous flat sheet form, and also to improvements in the apparatus and process disclosed therein, and includes, as one of the species thereof, the species disclosed in Fig. 11 of said patent and in Fig. 12 of my United States apparatus Patent No. 1,261,367, issued April 2, 1918.

It is found in the drawing or flowing of glass in sheet form, from a slab, trough, lip of a furnace, or other flattening means, over or down which it flows, that there is a tendency for the sheet to acquire streaks and lines on its under side as it flows from such means, especially if the glass is not at the proper temperature or condition for drawing, while the opposite side of the sheet has a smooth, perfect fire finish.

The object of my invention is to form sheet glass in such a manner as to prevent such objectionable forming of streaks and lines on the under side of the sheet as above described, thereby producing a more perfect sheet than has heretofore been possible, without necessitating a close watching and controlling of the flowing temperature of the glass.

This is accomplished by causing the molten glass to flow down a slab or other flattening means in split form for at least a portion of its length so that a glass film is provided at both sides of at least the tip or discharge end portion of the slab or flattening means from which the glass flows, and causing a merging or uniting of the separate films into a single sheet at the drawing or flowing off point, whereby the surfaces of the films having contact with the tip at the point of flowing off are united interiorly of the sheet and both outer surfaces thereof have the desired smooth fire finish. In other words, any roughness on the under side of the sheet caused by the flowing of such surface from contact with the slab or tip is obviated by uniting a thin film of molten glass with the sheet at its inner side and at or adjacent to its point of flowing from the slab, so that both sides are of the same nature and smoothness.

With this method of flowing the glass in sheet form, the temperature within the chamber in which is disposed the slab or member from which the sheet flows may be varied to a greater extent than has heretofore been possible without giving the sheet a streaky appearance. It is desirable, however, in the perfect forming of sheet glass to maintain as nearly a constant and uniform temperature condition within the tempering chamber as is possible.

The invention is preferably practiced in connection with a continuous melting tank from which the molten glass is caused or permitted to flow into a pot or trough disposed in a heated chamber in heat surrounded position and having means to regulate the temperature of the chamber so that the temperature condition of the glass can be regulated to the desired fluidity before flowing onto and down the slab or member from which it is drawn in sheet form, the pot or trough having a gate or other provision for regulating the quantity of glass flowing onto and down the slab or member. The slab or member from which the sheet flows or is drawn should be disposed in a heated chamber having provision for nicely regulating the temperature therein, whereby the heat of the slab or member and of the glass flowing down the same, may be controlled so that the glass may have the proper temperature and consistency to permit it to flow from the slab or member in sheet form.

The invention is fully described in the following specification, and while, in its broader aspect, it is capable of being practiced by numerous means, a few only of such means are illustrated in the accompanying drawings, in which,—

Fig. 3ᵃ is a rear view of the slab in Fig. 3. Fig. 8ᵃ is a fragmentary section on the line 8ᵃ—8ᵃ in Fig. 8. Fig. 10 is a top plan view of the slab shown in Fig. 9. Fig. 11 is a fragmentary sectional detail of a modified form of the furnace and slab. Fig. 12 is a sectional view of a modification of the slab in Fig. 11. Fig. 13 is a fragmentary sectional detail of a different modification of the furnace and slab.

Referring to the form of apparatus illustrated particularly in Figs. 1 to 4, 1 designates the melting furnace or tank, 2 the refining or main tempering chamber, the bottom of which forms a trough 3, over which molten glass flows from the melting or refining chamber to the heated forming chamber 4, where it flows onto and down a slab or member 5, from which the glass flows in properly regulated sheet form.

The tempering chamber 2 is preferably provided near its rear end with a gate 6, which is suitably suspended to enable it to be raised or lowered as desired. This gate may be used as a curtain-wall to separate two different temperatures in the furnace and the refining chamber, or it can be raised to equalize the temperatures therein, or it can be adjusted to regulate the temperatures of the furnace and chamber in proper relation to each other, or it can be used as a shut-off gate to stop the flow of glass from the tank when the sheet forming is stopped or when it is necessary to replace the removable front section 3ᵃ, of the trough 3, as hereinafter described.

A gate 7 is suspended in the front end portion of the refining chamber 2, to separate it from the chamber 4, and to coact with the trough 3, to regulate the flow of glass onto and down the slab 5. It is preferable to provide the opening 8, in the roof of the furnace, and through which the gate 7 is suspended, with a clearance space, which is regulated by loose brick or other suitable closure members 9, on top of roof. This clearance space enables the gate 7 to be laterally adjusted relative to the furnace to take care of any irregularities which may occur in the replacement location of the trough section 3ᵃ itself. The gate 7 at its lower end enters between guide strips 10 on the trough sides. The openings 11 in the furnace roof form vents for the chambers 2 and 4, and may be regulated by blocks (not shown) or in any other suitable manner to assist in regulating the temperature within said chambers.

Figure 4:
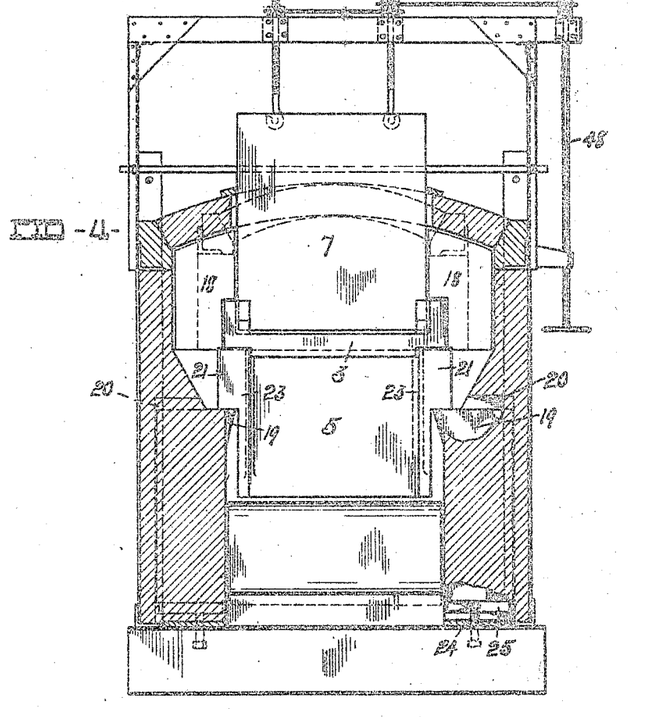
Fig. 4 is a cross section on the line 4—4 in Fig. 3.

The removable trough section 3ᵃ, is supported in heat surrounded position within the furnace by front and rear supporting walls 12 and 13, respectively, which cooperate with the furnace walls to form a heating chamber 14, beneath the trough section, said chamber being intended to have communication with the interior of the chamber 2, above the trough through passages at the sides of the trough which are formed by spacing the side edges of the trough from the side walls of the furnace. Heat is supplied to the interior of the chamber 14 from one or more burners 15, or in any other suitable manner. The trough section 3ᵃ rests loosely in the walls 12 and 13 and is removable laterally from the furnace through an opening 16, provided in one or both of its side walls, which openings are closed by bricks 17 or other suitable refractory material. The spaces between the gate 7 and side walls of the furnace at the front end of the tempering chamber 2 are closed by slabs or blocks 18 (Fig. 4).

The slab 5, onto which the glass flows from the trough 3 and from the outer or lower edge of which it flows in sheet form, is disposed, in the present instance, in substantially vertical or slightly inclined position within the chamber 4 beneath the discharge end of the trough 3, and is supported in proper relation to said trough by vertically adjustable side standards 19. These standards are mounted for vertical adjustment in recesses 20, provided in the respective side walls of the furnace and their upper ends are preferably projected inward to form broadened ledges on which the lower ends of side extensions 21, at the upper end portions of the slab 5, seat.

The trough 3 is provided at its discharge end with a downwardly extending lip 22, which projects down into a sheet-width-gauge recess formed in the upper end of the slab between side flanges or gauge shoulders 23 on the side edge portions of the slab. The glass from the trough 3 flows down onto the upper end of the slab 5, which, in the present instance, is flattened for such purpose, and the glass then divides and a portion flows over and down the front face of the slab and a portion flows through the space provided between the lip 22 and slab end and thence down the rear side of the slab. The two streams or films which flow down opposite sides of the slab and merge or unite at the tip or discharge end of the slab flow therefrom in the form of a single sheet a. It is preferable to have the film of glass, which flows down the rear or underside of the slab, thinner than the film flowing down the front, and the thickness of the rear film is regulated by a vertical adjustment of the slab to vary the width of the gauging space between the lip 22 and upper end of the slab. This adjustment is accomplished by a raising or lowering of the slab supporting standards 19, which is effected by a turning of the adjusting screws 24, which project up through a bottom plate 25 of each recess 20 and bear against the lower end of the respective standard.

Figure 1:
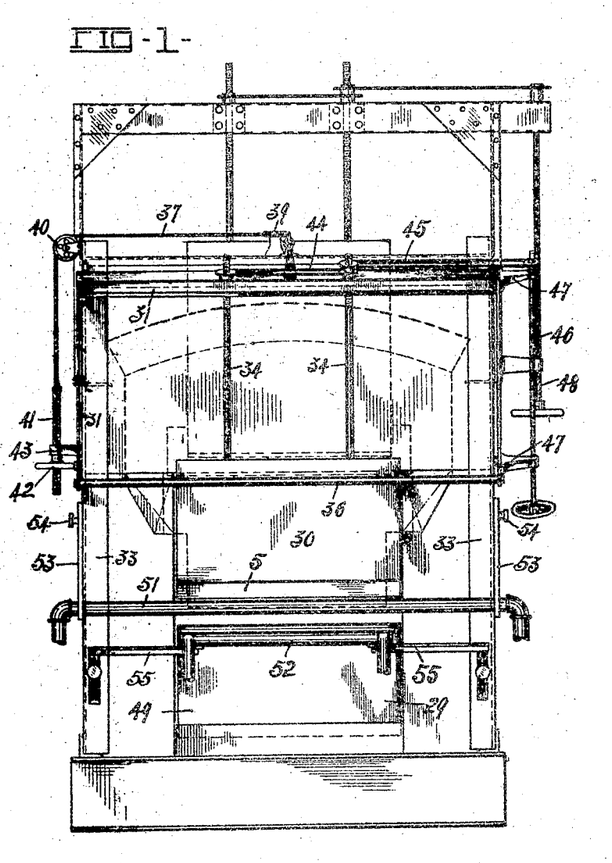
Figure 1 is a front elevation of a furnace embodying one form of apparatus for practicing the invention, with parts thereof, broken away.
Figure 2:
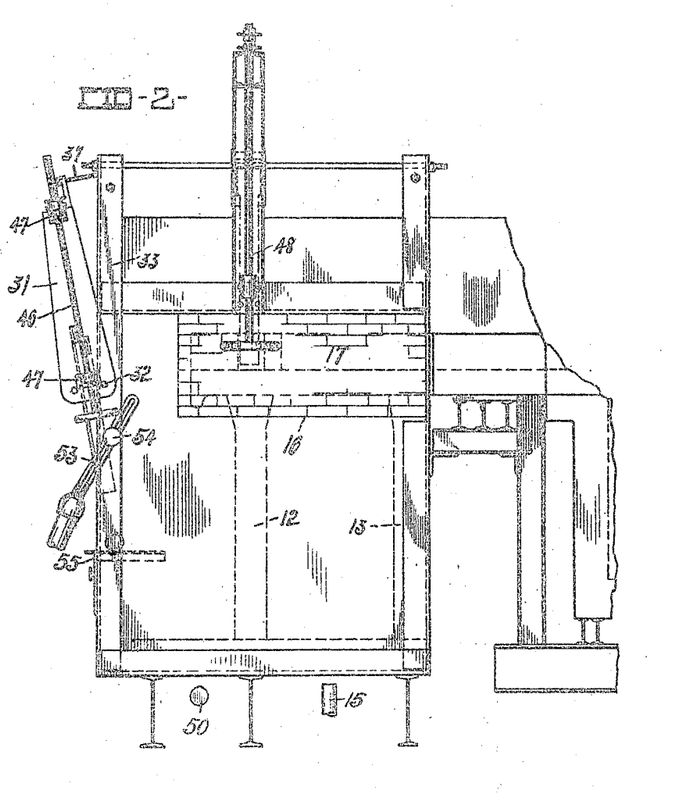
Fig. 2 is a fragmentary side elevation thereof.
Figure 3:
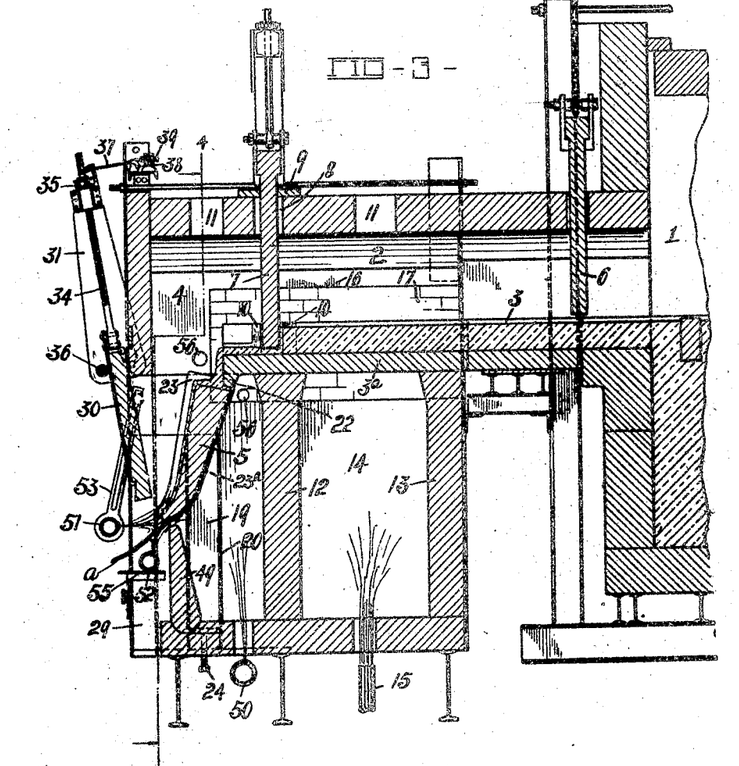
Fig. 3 is a central, vertical longitudinal section thereof.

The slab 5 preferably narrows in thickness toward its lower end to terminate in a more or less sharp nose or discharge tip portion and, in the present instance, its nose or tip portion is curved slightly forward in the direction of flow of the sheet therefrom. The edge walls or shoulders 23, which determine the width of the sheet, are extended down the face or front side of the slab to its discharge end, and the width of the film which traverses the rear side of the slab is determined by grooves 23ª, which extend throughout the length of the rear side of the slab and are in register with the wall formed by the shoulders 23 (see Fig. 3ª).

Figures 5, 5A, 6:
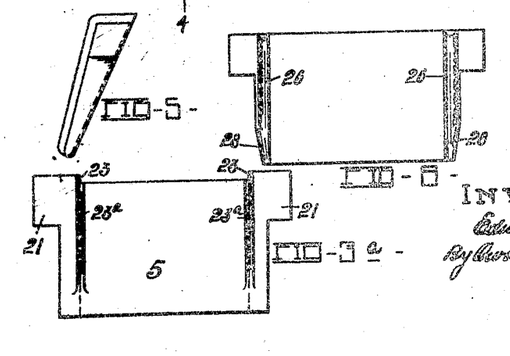
Figs. 5 and 6 are side edge and front elevations, respectively, of different modified forms of slabs for use in the furnace.
Figure 7:
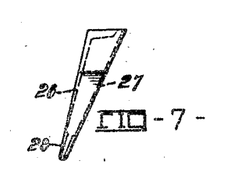
Fig. 7 is a side edge elevation of the slab shown in Fig. 6.

The slab 5 may be made in numerous forms, two of which are illustrated in Figs. 5, 6 and 7. In Fig. 5 the lower end of the slab is continued straight with its major portion, instead of being forwardly curved, and in Figs. 6 and 7, width gauging grooves or recesses 26 are substituted at the upper end and front side of the slab for the shoulders 23. The forward ends of the gauge grooves 26 on the front of the slab and the gauge grooves 27 on the rear thereof terminate short of the discharge end of the slab and merge into laterally tapered edge portions 28, whereby the film edges at the front and rear sides of the slab may flow laterally over the inclines formed by the tapered portions 28 and merge at the side edges of the slab before reaching the discharge end thereof. To facilitate this action the width of the slab is gradually narrowed at its forward end portion as shown.

The front edge of the forming chamber 4 is provided with an opening 29, which preferably extends from a point in advance of the trough 3, or the upper end portion of the slab 5, to the lower end of the chamber, and in width is substantially equal to the width of the slab. The upper portion of this opening is closed by a gate 30, which is capable of both vertical and swinging adjustment to place it in proper relation to the slab 5 to regulate the space between the lower end portions of the slab and gate as working conditions or temperature regulation within the chamber 4 may require.

A gate carrier frame 31 of inverted U-form is pivoted at the lower ends of its legs, at 32, to the front corner uprights 33 of the furnace adjacent to the top of the opening 29 to adapt the frame for forward and rearward swinging movements relative to the furnace. The gate 30 is suspended from the frame 31 by threaded rods 34 which project up through the top cross portion of the frame and through nuts 35 resting thereon whereby a turning of said nuts will effect a vertical adjustment of the gate. The gate is slidingly held to the upper marginal edge wall of the opening 29 by a guide roller 36 carried by the side arms of the frame 31 at their lower ends in advance of the pivots 32 thereof. It is thus evident that a swinging adjustment of the gate is effected by a swinging adjustment of the frame 31. A cable 37 extends rearward from the cross member of the frame 31 over a sheave 38 on the front top edge of the furnace, thence around a sheave 39 to one side of the furnace where it passes over and down from a sheave 40 to a threaded adjusting rod 41, which is threaded from a hand nut 42, the upper end thrust of which is against a bracket arm 43 projecting from the adjacent side arm of the frame 31.

For convenience of adjustment, the adjusting nuts 35 for the gate suspending rods 34 have sprocket wheels formed thereon which are connected by a sprocket chain 44, and one of these nuts has a second sprocket wheel provided thereon that is connected by a sprocket chain 45 to a sprocket wheel on the hand control shaft 46 that is journaled in bracket arms 47 projecting from the adjacent side arm of the frame 31. The adjustment and control for the gate 7 is similar to that described for the gate 30, as shown in Figs. 1 to 4, the hand control shaft for such adjusting means being designated 48.

A gate or damper member 49 is mounted in the lower portion of the front opening 29 below the discharge end of the slab 5 in desired spaced relation thereto. This gate, in the present instance, rises from the bottom of the chamber 4, preferably in rearwardly spaced relation to the front edges of the side walls of said chamber and has its lower edge transversely rounded to adapt it to seat in a complemental recess in the chamber bottom in a manner to permit the gate to have forward or rearward swinging adjustment.

The chamber 4 may be heated by subjacent burners 50 in addition to the heat which enters the same from the chambers 2 and 14 by radiation through the dividing walls or through cracks or loose joints which may be present between the chambers. The chamber 4 is also heated by flames from front burners 51 and 52, which are respectively disposed above and below the formed sheet a in position to direct their flames thereagainst and into the chamber 4 through the spaces between the slab and the adjacent edges of the gates 30 and 49. The flames from these burners follow the respective surfaces of the slab for a greater or less distance and serve to fire finish and to maintain at proper consistency the films of glass flowing down the respective sides of the slab. The upper burner 51 is adjustably carried by arms 53 which are longitudinally slotted to adjustably engage with carrying screws or clamping members 54 on the adjacent corner uprights 33 of the furnace. The lower burner 52 rests on brackets 55, which are secured for vertical adjustment to the respective corner uprights 33 and project into the opening 29 in advance of the gate 49.

56, 56 designate peep openings provided in one or both side walls of the chamber 4 in position to view the glass at the upper portion of the slab as it flows down both sides thereof.

Figures 14, 15, 16, 17, 18, 19, 20, 21, 22, 23, 24, 25, 26, 27, 28, 29, 30, 31:
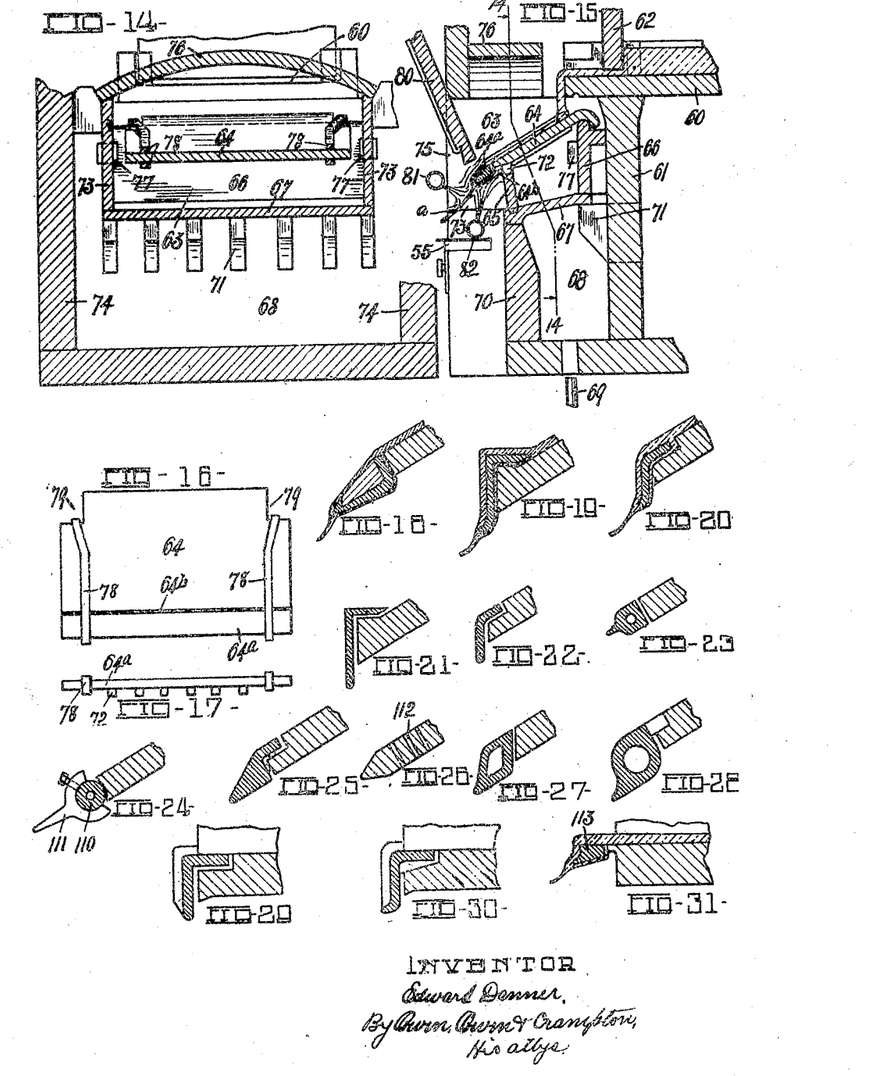
Figs. 14 and 15 are cross and longitudinal fragmentary sectional details of still another modification of the furnace and slab.
Figs. 16 and 17 are plan and front edge views, respectively, of the slab shown in Figs. 14 and 15.
Figs. 18 to 31 are fragmentary sectional views of slabs equipped with different forms of tips.

In the forms of the invention illustrated in Figs. 8, 9, 11, 14 and 15, the furnace, with respect to the chamber in which the slab is disposed, is of the muffle type, the slab being heated by radiant heat through thin walls except for the flames from the front fire finishing burners. Referring particularly to Figs. 14 and 15, 60 designates the trough over which the molten glass flows from the furnace or source of supply to the forming chamber, 61 the front supporting wall or standard for said trough, 62 the regulating gate at the front end of the trough, 63 the muffled forming chamber, and 64 the slab disposed in said chamber and onto and down which the glass from the trough 60 flows and passes therefrom in sheet form. The slab 64 is supported in downwardly and forwardly inclining position by front and rear blocks or standards 65 and 66, respectively, which are in turn supported by a thin slab 67 forming the roof of the heating chamber 68. This chamber is heated by burners 69, or in any other suitable manner, and has its rear wall formed by the wall 61 and its front wall formed by the block or wall 70 which supports the forward end of the roof slab 67. The rear end of said roof slab rests on blocks or forward projections 71 on the wall 61. The rear end portion of the slab 64 projects under the forward end of the trough 60 and is curved to adapt it to seat or hook over the upper edge of the block 66. The front end of the slab 64 is provided at its under side at a distance to the rear of its nose portion with a plurality of lugs 72, which are rounded in convex form at their lower ends to adapt them to seat in a complemental recess or cavity formed in the upper edge of the supporting slab 65. The lower edge of this supporting slab may be loosely seated in a recess in the forward edge portion of the roof slab 67. The spaced lugs 72, while cooperating with the upright slab 65 to support the sheet gauging slab 64, provide for the passage of hot air lengthwise of the under side of the slab 64, either forwardly or rearwardly thereof in accordance with the draft.

The muffled chamber 63 in which the slab 64 is disposed has its ends formed by upright slabs 73, which rise from the ends of the slab 67 and extend upward therefrom above the slab 64 in spaced relation to its ends and also in spaced relation to the side walls 74 of the furnace. The end slabs 73 are preferably extended forward to the forward edge of the front opening 75 of the furnace. The top of the muffle chamber 63 is closed in advance of the trough 60 by a roof arch 76, except for a narrow space provided between said arch and the trough end, as shown, which opens communication with the upper rear portion of the muffle chamber. The rear slab or block 66 is held to the wall 61 or prevented from falling forward by blocks 77, one of which is inserted into an opening in each end slab 73 in position to engage the front side of the slab 66. It is evident that the heat in the chamber 68 entirely encompasses the muffle chamber in which is disposed the inclined slab 64 from which the sheet a flows.

The slab 64 is provided in advance of the front supporting slab 65 with a tip or nose portion 64ª, which projects from the slab 64 in substantially the plane thereof and is slightly spaced therefrom to form the narrow dividing slot 64ᵇ through which passes a thin film of the glass which flows over the slab 64. This film follows the bottom contour of the tip and then merges with and forms the under fire finished surface of the sheet a flowing from the slab. The tip 64ª may be of metal, and in the present instance, is supported and held in properly spaced relation to the slab 64 by bands or straps 78 of metal, which extend around the respective end portions of the slab and tip, as shown.

These bands may also serve as guide strips for the width of the sheet flowing down and from the slab and are adjustable transversely of the slab to vary the width of the sheet. The inner corners of the slab around which the bands 78 pass, may be notched or incut, as at 79, so that the bands will not extend to the rear support 66.

The portion of the front furnace opening 75 above the nose of the slab 64 may be closed or controlled by a gate 80, which in mounting and action, is like the gate 30 of the apparatus first described. Burners 81 and 82 are mounted above and below the formed sheet $a$ and may be the same in action, effect and mounting as the corresponding burners of the apparatus first described.

Figure 8:
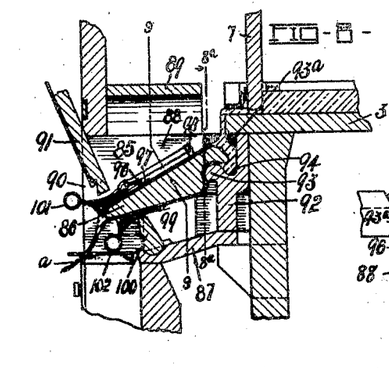
Fig. 8 is a fragmentary sectional detail of a modified form of the slab and slab enclosing chamber of the furnace.
Figures 8A, 10, 11, 12, 13:
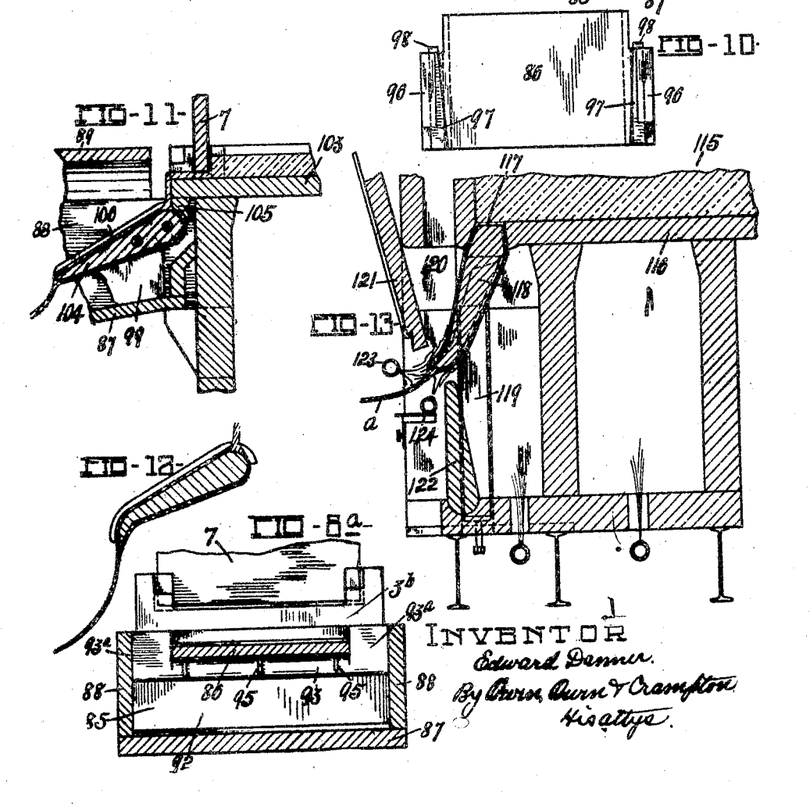
Figure 9:
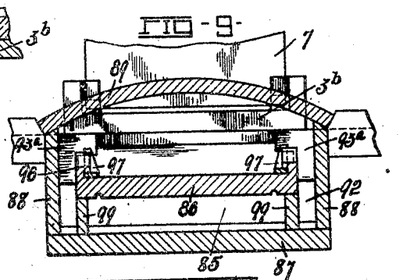
Fig. 9 is a fragmentary section thereof on the line 9—9 in Fig. 8.

In Figs. 8, 9 and 11, the arrangement and manner of heating the slabs from which the glass flows is the same as described in connection with Figs. 14 and 15, except that the slabs are mounted somewhat differently and the glass divides into separate films at the upper or inner ends thereof so that the under film flows the entire length of the under or rear side of the slab instead of merely under the nose or tip portion thereof.

In Figs. 8 and 9 the muffle chamber, which is designated 85, and in which is disposed the slab 86 from which the glass sheet flows, has its bottom ends and top walls formed by the slabs 87, 88 and 89, respectively, in substantially the same manner as described for Figs. 14 and 15, and the upper portion of the front opening 90 of said chamber is closed by the adjustable gate 91, the same as hereinbefore described. The rear wall of the muffle chamber is formed by the upright slab 92, which is provided on its front side with a hooked or upwardly and forwardly rounded portion 93 forming a trough or recess 94. The inner end portion of the slab 86 is provided in its under side with a recess, which is adapted to hook over the portion 93 in slightly spaced relation thereto to provide a thin passage therebetween for a film of glass flowing from the trough 94 down the under side of the slab 86, as shown. For this purpose the glass stream flowing from the supply trough 3 is deposited in the trough or recess 94 and flows forward therefrom down both the upper and under sides of the slab 86. The rear recessed end of the slab 86 which engages over the front edge wall 93 of the trough 94 and is properly spaced therefrom to regulate the thickness of the glass film passing therebetween under the slab by a plurality of spacing members 95, which may comprise narrow metal strips bent to removably fit over the wall or projection 93. The ends of the trough 94 are closed by end walls 93ᵃ, which are integral with the rear slab 92 and rise from the end portions of the projection 93 to the top of the slab 92 to fit at their upper ends against the bottom of the trough 3ᵇ. The rear corners of the slab 86 are notched or incut to fit around the end walls 93ᵃ of the trough 94.

The sides of the slab 86 are provided on the top side edges thereof with ledges or ribs 96 the inner side edges of which are under-cut to receive the outer edges of gauge strips 97 removably positioned therein, and which have upstanding lugs 98 at their upper or inner ends for engaging the inner ends of the ledges 96 to hold the strips in position. These strips may have their inner sides tapered so as to cooperate to gradually narrow the space therebetween from the inner to the outer end of the slab 86 to cause a slight thickening of the edge portions of the sheet flowing down the slab. For adjustment the strips 97 may be removed and other strips of suitable width and shape substituted therefor. The slab 86 is supported in advance of the slab 92 at its side edges by slabs or blocks 99, which rest at their lower edges on the bottom slab 87 of the muffle chamber.

A damper or gate 100 is supported by the forward edge portion of the bottom slab 87 for forward and rearwardly swinging adjustment and has its upper edge terminating adjacent to the bottom of the slab 86. Burners 101 and 102 are preferably disposed above and below the sheet $a$ in position to direct their flames against the sheet adjacent to its point of leaving the slab 86 to fire finish the surface of the upper and lower films which pass down the slab and to assist in regulating the temperature of the glass.

The apparatus which is fragmentarily illustrated in Fig. 11, differs primarily from that of Figs. 8 and 9 in that the glass stream from the supply trough 103 flows onto the rear end of the slab, which is designated 104, and thence divides so that the major portion flows down the top surface of the slab while the remaining portion constitutes a thin film that flows around the rear edge of the slab and thence down the under side thereof, being regulated in thickness by the spacing between the slab and a lip 105 on the lower edge of the discharge end of the trough, the apparatus being similar in this respect to that illustrated in Fig. 3. The slab 104 is provided on its top surface at its side edges with gauge shoulders 106 which extend from the forward end of the slab to and partly around the rear curved end thereof, as shown. In this slab the discharge end thereof continues straight in the general plane of extension of the slab, while in Fig. 12 the same construction of slab is illustrated as having its discharge end curved downwardly.

In Figs. 18 to 31 are illustrated various forms of discharge ends for the slabs from which the sheet is drawn or may flow, some of the slabs being inclined and others being horizontally disposed. These tips are of various constructions and may be of metal or other suitable material, and so disposed with respect to the slab proper as to cause a division of the stream of glass flowing down the slab so that a portion thereof flows down or at the front side of the tip and a portion thereof, preferably a film which is relatively thinner than the front or top stream, flows under or down the rear side of the tip to the point where the two films or streams are permitted to merge into a single sheet that flows from the tip.

In the form illustrated in Fig. 24, 110 designates a tip portion of cylindrical form around which the glass flows, and 111 designates a width gauging finger one of which is fixed to each end of the tip and is rotatably adjusted thereon to cause it to project from the tip in the general direction of flow of the sheet therefrom.

In the form shown in Fig. 26, the tip is integral with the slab and the slab is provided adjacent to its forward or flowing off end with a plurality of openings 112, which permit a portion of the glass which flows down the slab to pass therethrough and flow in film form down the under side of the slab.

In each of Figs. 29, 30 and 31, the slab from which the sheet of glass flows is shown as being horizontally disposed, and in the first two of these figures the slab is provided with a tip portion which permits the sheet to flow in double film form down the same preparatory to passing therefrom. In Fig. 31 the tip, which is designated 113, is disposed slightly in advance of the slab with its top surface on a plane with the surface of the slab and with its bottom surface preferably downwardly inclined, the forward end of the tip, in the present instance, being of greater vertical thickness than its rear end. The films of glass which pass around the tip merge at the lower front edge thereof and pass therefrom in single sheet form as indicated. The tips if made of metal or made separate from the slabs may be secured thereto by bands, as shown in Fig. 16, or in any other suitable manner.

In the apparatus illustrated in Fig. 13, 115 designates the refining or tempering chamber to which the glass is supplied in molten form in any suitable manner, as by being connected with a melting tank, and this chamber is provided in its bottom 116 at the forward end thereof with a discharge opening 117, which is partially blocked or closed by the upper end of a slab 118, which slab forms the member down which the glass flows in thin film form and from the discharge end of which it flows or flows in the form of a sheet *a*. The discharge opening 117 is of suitable length to conform to the width of the sheet or stream which it is desired to flow from the chamber 115 and its front and rear walls are preferably tapered so that the width of the opening is gradually increased downwardly from its upper edge. The upper end of the slab 118 is made of substantially the same tapered contour as the discharge opening 117 so that it may serve to entirely close said opening, or, when lowered from its closed position, to provide thin discharge spaces for the glass at front and rear of the slab, and also at the end edges if desired, the size of such spaces being determined by the extent of lowering of the slab relative to the chamber bottom. The slab 118 is supported at its opposite ends by vertically adjustable standards 119 in the same manner as described in connection with the supporting means of the slab in Fig. 3. The chamber 120, in which the slab 118 is disposed, is substantially the same as the chamber 4 in the apparatus illustrated in Fig. 3, being heated in substantially the same way and having substantially the same adjustable front gates 121 and 122. Fire finishing burners 123 and 124 are also provided above and below the formed sheet adjacent to the discharge nose of the slab.

Figure 32:
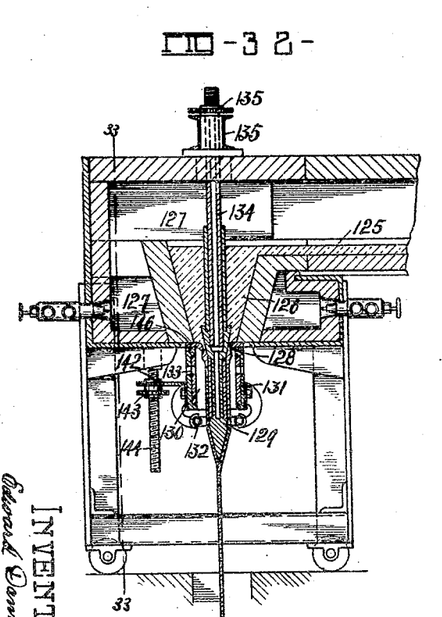
Fig. 32 is a fragmentary sectional view of a modified form of the furnace and slab drawing off means illustrated in Fig. 11 of my said former patent.

A form of apparatus somewhat similar to that illustrated in Fig. 13 is shown in Fig. 32 and is taken from my prior Patents Nos. 1,261,366 and 1,261,367, dated April 2, 1918. In this apparatus the trough 125, in which the molten glass flows from the furnace or other source of supply, terminates at its outer end in a pot or tank 126 that is disposed within a heating chamber 127, which is heated in any suitable manner. The pot 126 is elongated transversely of the trough 125 to suit the width of the glass sheet to be formed and is provided at its bottom with an elongated opening 128 which extends substantially the length of the pot. A slab 129 of corresponding shape in cross-section to the opening 128 projects down through said opening and into a heating chamber 130, which is formed immediately below the bottom of the pot 126 by a shell 131, which surrounds the slab 129 to near the lower end thereof. The lower end of the heating chamber 130 is opened to permit the flames, in the present instance, from a burner 132, to pass upward therein from below the same and around the glass that is flowing down the slab 129, such flames finding an exit from the top portion of said chamber through openings 133 in the shell 131. It is evident that the flames from the burner 132, or the heat generated thereby, which rises around the glass as it flows down from the pot in encircling relation to the slab 129, fire finishes the surface of the glass and also maintains it at proper drawing consistency. The discharge end of the slab 129 gradually narrows to permit the glass films flowing down the opposite sides thereof to merge and pass together in single sheet form from the lower end of the slab.

Figure 33:
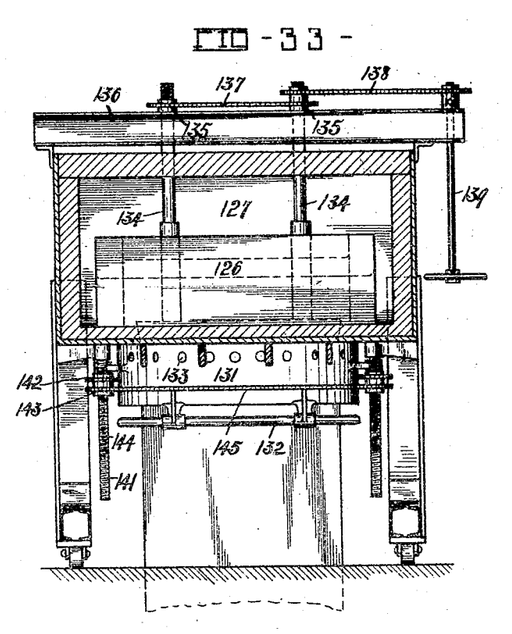
Fig. 33 is a cross sectional view thereof on the line 33—33 in Fig. 32.

The slab 129 is carried by stems 134, which project up through the pot and the top of the heating chamber 127, being provided above said top with sprocket wheels 135, which are threaded on said stems and rest at the lower ends of their hubs on a cross beam 136 at the top of the furnace. The sprocket wheels 135 are connected by a sprocket chain 137 and one sprocket wheel has chain and sprocket connection 138 with an adjacent shaft 139, whereby a turning of said shaft will effect a uniform turning of the sprocket wheels 135 and a vertical adjusting of the slab 129. The head portion of the slab is preferably tapered or of wedge form whereby a raising or lowering thereof within the outlet 128 of the pot effects a variation in the size of such opening to regulate the flow of molten glass from the pot. The shell 131 is preferably vertically adjustable with respect to the slab 129, and for this purpose is provided at opposite ends with arms 140 through which extend rods 141 that project downward from the bottom of the furnace. A sprocket wheel is threaded on each of these rods in supporting relation to the arm 140 through which extend rods 141 that project downward from the bottom of the furnace. A sprocket wheel is threaded on each of these rods in supporting relation to the arms 140 and are connected by sprocket chains 142 to one member of a double sprocket wheel 143 threaded on a vertical rod 144 at one side of the rod 141. The other members of the sprocket wheels 143, 143 are connected by a sprocket chain 145. It is thus evident that a movement of said chain 145 will effect a simultaneous and uniform vertical adjustment of sprocket wheels (not shown) which are carried by the rods 141. One advantage of mounting the shell 131 for vertical adjustment is to facilitate a replacing of the plate 146, which forms the opening 128, in the bottom of the pot 126.

Figures 34, 35, 36:
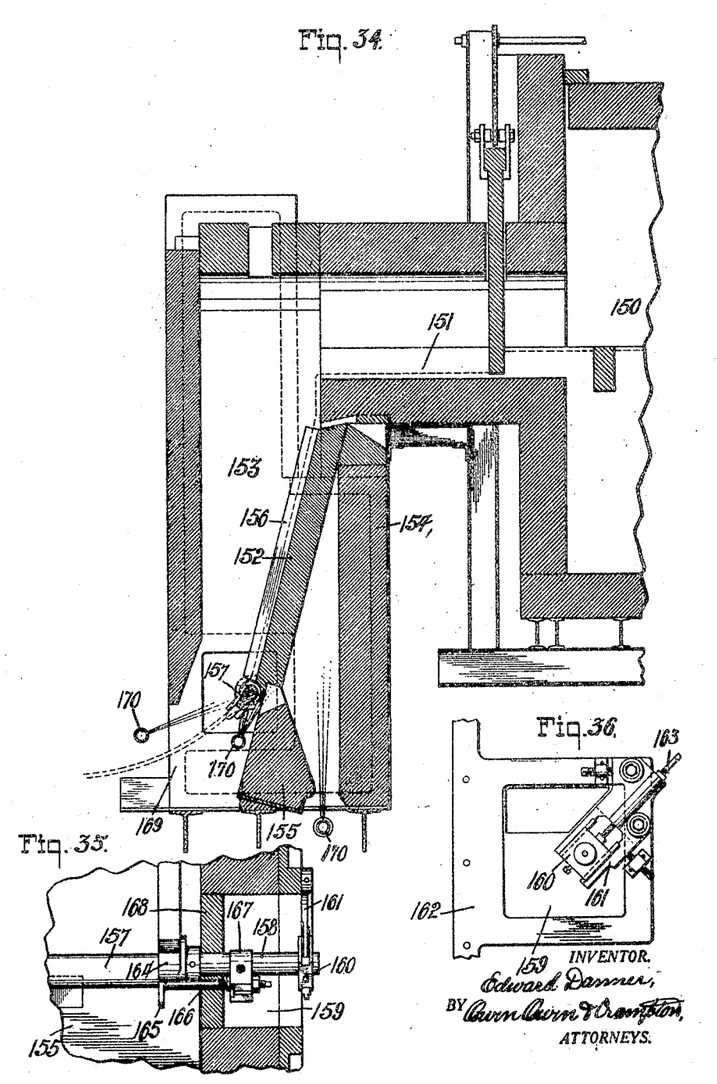
Fig. 34 is a central vertical longitudinal section of a different form of apparatus for practicing the invention.
Fig. 35 is a fragmentary vertical cross sectional view thereof.
Fig. 36 is a fragmentary side view of the casing showing an end bearing for the slab tip.

In the form of apparatus illustrated in Figs. 34 to 36, the glass flows from a furnace or source of supply 150 over a trough 151 and down the front or upper side of an inclined slab 152 disposed in a tempering chamber 153, as is also the forward portion of the trough 151. The slab 152 is stationarily mounted, bearing at its upper end against the rear wall 154 of the chamber 153 immediately below the discharge end of the trough 151 in position for the molten glass to flow from the trough onto and down the front face of the slab, and having its lower end supported at its rear edge by a base block 155 disposed within said chamber. The slab is of trough form having edge strips or flanges 156 for limiting the width of a stream of glass flowing down the same. A tip 157 is mounted at the lower end of the slab 152 for adjustment toward and away from the slab to vary the spacing therebetween and also for rotary adjustment to suit the direction of drawing of the sheet therefrom. This tip, in the present instance, is transversely broadened and tapers to a reduced forward edge to facilitate joining at the forward edge of the tip the films or streams of glass which flow around the opposite sides thereof. The tip is provided with end trunnions 158 projecting outwardly from the tempering chamber through openings 159 in its respective side walls, and each trunnion is journaled at its outer end in a bearing block 160 that is mounted for inclined adjustment in a guide bracket 161 that is fixed to the side frame 162. The bearing block is attached to the lower end of an adjusting screw 163, which is threaded in the bracket 161, longitudinally of the direction of adjustment of the block. The adjustment of the tip with the bearing blocks 160 effects a varying of the space between the tip and lower end of the slab so that more or less glass may flow down the under side of the tip as may be desired. The tip is preferably made of nichrome, and fixed to the shaft at each end thereof is a collar 164. A width gauge maintaining finger 165 for the sheet is provided in advance of each collar 164 and is carried at the inner end of a stem 166, which projects lengthwise of the adjacent trunnion 158 and is adjustably carried by a clamp 167 projecting from the trunnion. The inner end portion of each wall opening 159 may be closed around the tip trunnion by fire brick 168, the arrangement of which may be changed to suit the adjustment of the tip. The sheet of glass, in the present instance, is drawn from the tip 157 through a front opening 169 in the lower portion of the tempering chamber 153. Burners 170 are arranged to direct their flame against the glass at both sides of the tip and also to heat the portion of the tempering chamber at the rear of the slab. The side edges of the slab are spaced from the side walls of the chamber to facilitate a circulation of heat therearound.

The sheet of glass which flows from the slab or tip as the case may be, may flow therefrom by gravity in continuous vertical direction or have its direction of movement from a vertical changed to a horizontal or other angle before the glass has cooled sufficiently to prevent bending. If the sheet is drawn laterally from the discharge end of a slab or tip as illustrated in several of the figures, it is, of course, necessary to apply a pulling stress thereto to effect such lateral drawing and this stress will tend more or less to stretch or thin the sheet. It is found, however, that perfect sheet glass can be formed by gravity action alone as it flows from the slab or tip of the directing means and that it is not necessary or desirable to exert any pulling or stretching force on the sheet. If the gravity is such as to cause too great a thinning of a sheet, then a sheet supporting or backing up means may be employed, as is common in the art. I therefore wish it understood that the terms "drawing", "drawn" or "draw" as used herein do not necessarily mean the application of a pulling stress on the sheet, but are used broadly in the sense of flowing.

It is evident that in the use of each of the apparatus shown and described, the molten glass is caused to flow in a molten state down a slab which is disposed in a heated atmosphere and is itself heated, the glass being distributed in sheet or film form over the surface of the slab and being divided, before reaching the discharge end of the slab, into separate sheets or films which traverse opposite sides of the slab and merge or unite at the tip or discharge end of the slab so that they are permitted to flow from the slab in the form of a single sheet having both surfaces fire finished and free from marring or streaking caused by contact with the slab.

I wish it understood that the forms of apparatus herein described and shown for producing my invention, are merely for the purpose of illustration and not to restrict the scope of the invention defined in the claims beyond what is required by the art.

Having thus described my invention, what I claim as new, and desire to secure by Letters Patent, is:—

1. The method of forming sheet glass, consisting in causing molten glass to flow in laterally divided form around and down a directing part in a tempering heat and in merged single sheet form therefrom.

2. The method of forming sheet glass, consisting in flowing molten glass down and from a directing member in sheet form, with the glass exposed to a tempering heat during such flow, and causing a film of molten glass to unite with the member contacting side of the sheet as it leaves the member.

3. The method of forming sheet glass, consisting in flowing molten glass down and from a directing member in sheet form, with the glass exposed to a heated atmosphere during such flow, and causing a film of molten glass to flow along the opposite side of the member in contact therewith and to merge with the inner side of said sheet as it passes from said member.

4. The method of forming sheet glass, consisting in flowing molten glass from a source of supply, separating the flowing stream into films of sheet form exposed at their outer sides to a heated atmosphere and causing the films while still fluid to unite and form the opposite surfaces of a finished sheet.

5. The method of forming sheet glass, consisting in flowing molten glass from a source of supply in regulated sheet form along a directing and supporting means, separating the sheet into films before leaving said means, and permitting the films to unite and flow in single sheet form from said means with the films forming opposite side surfaces of the sheet.

6. The method of forming sheet glass, consisting in flowing molten glass from a source of supply, separating the flowing stream into films of sheet form in the presence of heat to maintain the consistency of the films and to heat finish their outer surfaces, then uniting and flowing the films in single sheet form with the fire finished surfaces thereof forming the outer surfaces of the sheet.

7. The method of forming sheet glass, consisting in flowing molten glass from a source of supply in regulated sheet form along a directing and supporting means disposed in a heated atmosphere, separating the sheet into films before leaving said means and with the inner or adjacent surfaces of the films in contact with the means, then uniting said films without the discharge end of said means to form a single sheet having heat finished surfaces.

8. The method of forming sheet glass, consisting in flowing a stream of molten glass along a directing and width regulating means, causing a splitting of the stream laterally of its faces by said means to form separated sheets having their inner sides only in flowing contact with the directing means, subjecting said separated sheets to a heated atmosphere to temper the sheets and to heat finish the outer surfaces thereof, and then merging the separated sheets at the discharge end of the directing means and flowing them therefrom in single sheet form.

9. The method of forming sheet glass, consisting in flowing a stream of molten glass along a heated directing means in the presence of a tempering heat causing a splitting of the stream laterally of its faces by said means to form separated sheets having their inner adjacent sides only in contact with the means, heat finishing the outer surfaces of said sheets, flowing the sheets in merged single sheet form from the discharge end of the directing means with the heat finished surfaces of the separated sheets forming the outer unmarred surfaces of the single sheet.

10. The method of forming sheet glass, consisting in flowing molten glass in divided relation down opposite sides of a directing member in the presence of heat to maintain the glass at proper temperature and to heat finish the outer surfaces thereof, and merging the divided portions at and flowing them in single sheet form from the discharge end of the member.

11. The method of forming sheet glass, consisting in flowing molten glass in divided relation down opposite side portions of a vertical directing member in the presence of heat, and merging the divided portions at and flowing them in single sheet form from the discharge end of the member, the outer heat finished surfaces of the divided portion forming the outer surfaces of the sheet.

12. The method of forming sheet glass, consisting in flowing a tempered stream of glass onto and in divided films in the presence of heat down opposite sides of a slab disposed at an angle to a horizontal, merging the films at the discharge end of the slab and flowing them therefrom in single sheet form with the outer heat finished surfaces of the films forming the surfaces of the sheet.

13. The method of forming sheet glass, consisting in flowing a stream of molten glass down a vertical slab in the presence of heat, flowing it in sheet form from the discharge end thereof, and causing a film of glass to flow laterally from the stream at the rear of the discharge end of the slab thence down the rear side of the slab and to merge with the sheet as it flows from one slab to form the under surface thereof.

14. In an apparatus for forming sheet glass, means for directing the flow of a stream of molten glass from a source of supply and from the discharge end of which means the glass flows in sheet form, said means including a vertical slab down opposite sides of which the glass flows in laterally separated film form and at and from the lower end of which the films merge and flow in single sheet form.

15. In an apparatus for forming sheet glass, a heated chamber, and means for directing the flow of molten glass through said chamber and from the discharge end of which means the glass flows in sheet form, said means having provision for a film of glass to flow laterally from the stream and along the opposite side of said means and to merge with the sheet at its inner side as it flows from said means.

16. In an apparatus for forming sheet glass, means for directing the flow of a stream of molten glass and from the discharge end of which means the glass flows in sheet form, said means having provision for portions of the glass stream to flow in film form to and along opposite sides of a portion thereof and to merge and flow from the lower end thereof in single sheet form, and means for maintaining the films and stream of glass at proper temper and for heat finishing the outer surfaces of the films.

17. In an apparatus for forming sheet glass, a heated chamber, means for directing the flow of a stream of glass from a source of supply through said chamber and including a slab at an angle to a horizontal down which the glass flows in sheet form, said means having provision for a portion of the glass stream to flow in film form to and along the rear side of the slab and to merge with and form a heat finished surface for the slab contacting surface of said sheet as it flows from the slab.

18. In an apparatus for forming sheet glass, a heated chamber, means for directing the flow of a stream of glass from a source of supply through said chamber and including a vertical slab down which the glass flows and from which it is drawn in sheet form, said means having provision for a portion of the glass stream to flow in film form to and along the rear side of the slab and to merge with and form the respective side of the sheet as it flows from the slab.

19. In an apparatus for forming sheet glass, a heated chamber having an outlet opening, means for delivering a stream of molten glass in tempered form to said chamber, means within said chamber onto which the glass flows from said first means and from the end of which the glass flows in sheet form through the chamber opening, said last means having provision for dividing the glass stream into laterally separated films which flow along opposite sides thereof and unite at the discharge end of said last means to form the opposite surfaces of the sheet.

20. In an apparatus for forming sheet glass, a heated chamber having an opening, means for delivering a stream of molten glass to said chamber, a slab within the chamber onto and along which the glass flows from said means and from the discharge end of which the glass flows in sheet form through said opening, said slab having provision for dividing the glass stream into laterally separated films which flow along opposite sides thereof and unite at its discharge end to form the opposite surfaces of the sheet flowing from the slab, and means for regulating said opening.

21. In an apparatus for forming sheet glass, means from which a stream of molten glass flows, a member onto and along which a stream of glass flows from said means and from the discharge end of which it flows in sheet form, a portion of the glass stream being permitted to flow between said means and member to the rear of said member and thence along the same and to merge in film form with the rear of the sheet as it flows from said member, said member being adjustable relative to said means to vary the thickness of said film.

22. In an apparatus for forming sheet glass, means from which a stream of glass flows, a member onto and along which the glass flows from said means and from the discharge end of which it flows in sheet form, a portion of the glass stream being permitted to flow between said means and member to the rear of said member and thence along the same and to merge in film form with the rear of the sheet as it flows from said member, means supporting said member and adjustable to vary the position of the member relative to said means to regulate the thickness of the film flowing down the rear side of the member.

23. In an apparatus for forming sheet glass, a heated chamber, means for delivering a stream of molten glass to said chamber, means within the chamber onto which the glass flows from said first means and which causes the stream to divide into films which flow down opposite sides thereof and merge at and flow from the discharge end of said last means in single sheet form, said stream dividing means being adjustable relative to said means to vary the thickness of the films flowing down the opposite sides thereof.

24. In an apparatus for forming sheet glass, a heated chamber, means for delivering a stream of molten glass to said chamber, a slab disposed in said chamber and causing the stream flowing from said means to separate and flow in laterally spaced films down opposite sides of the slab and to merge at and flow from the discharge end of the slab in a single sheet, and means supporting the slab and adjustable to vary its position relative to said means.

25. In an apparatus for forming sheet glass, means forming a molten glass supply and having a discharge outlet in its bottom portion, means cooperating with said outlet to partially close the same and to cause glass to flow therefrom in laterally divided streams which merge and flow in single sheet form from the lower end thereof.

26. In an apparatus for forming sheet glass, means forming a molten glass supply and having a discharge outlet in its bottom portion, means cooperating with said outlet to partially close the same and to cause glass to flow therefrom in laterally divided streams which merge and flow in single sheet form from the lower end thereof, and means for controlling the temperature of the glass flowing down said second means.

27. In an apparatus for forming sheet glass, means forming a molten glass supply and having a discharge outlet in its bottom portion, means cooperating with said outlet to partially close the same and to cause glass to flow therefrom in laterally divided streams which merge and flow in single sheet form from the lower end thereof, said second means being adjustable relative to the first means to regulate the size of the opening and the consequent thickness of the glass streams flowing therefrom.

28. In an apparatus for forming sheet glass, means forming a molten glass supply and having a discharge outlet in its bottom portion, means cooperating with said outlet to partially close the same and to cause glass to flow therefrom in laterally divided streams which merge and flow in single sheet form from the lower end thereof, said second means being adjustable relative to the first means to regulate the size of the opening and the consequent thickness of the glass streams flowing therefrom, and means for controlling the temperature of the glass flowing down said second means.

29. In an apparatus for forming sheet glass, means forming a source of molten glass supply and having a horizontal elongated discharge opening in its bottom portion, a slab adjustably projecting into said opening to serve as a gate for regulating the size of the opening and providing a glass discharge space at each side thereof whereby glass may flow down opposite sides of the slab in regulated film form and merge and flow in single sheet form from the lower end thereof.

30. In an apparatus for forming sheet glass, means forming a source of molten glass supply and having a horizontal elongated discharge opening in its bottom portion, a slab adjustably projecting into said opening to serve as a gate for regulating the size of the opening and providing a glass discharge space at each side thereof whereby glass may flow down opposite sides of the slab in regulated film form and merge and flow in single sheet form from the lower end thereof, and means for tempering the glass films flowing down the slab.

31. The method of forming sheet glass, consisting in flowing a film of molten glass with one side in contact with a plane surface of a solid and with the other side contacted by gases only, moving the film from contact with the solid and uniting another film of glass to the side that was contacted by the solid.

32. The method of forming sheet glass, consisting in flowing a film of molten glass with one side in contact with a plane surface of a solid and with the other side contacted by gases only, moving the film from contact with the solid, simultaneously forming another film in the same way, and uniting the surfaces of the films that contacted the surfaces of the solid as they leave said surfaces.

33. The method of forming sheet glass, consisting in flowing films of molten glass, each with one surface fire finished, to a uniting point and there uniting the films while still plastic and with the fire finished surfaces of the films forming the surfaces of the united sheet.

34. The method of forming sheet glass, consisting in flowing molten glass from a source of supply, separating the flowing stream into films of sheet form exposed at their outer sides to the atmosphere, and causing the inner sides of the films while still plastic to unite to form a single sheet from the films.

35. The method of forming sheet glass, consisting in causing molten glass to flow in laterally divided form around and down a directing part and in merged single sheet form therefrom.

36. In an apparatus for producing sheet glass, a member having downwardly converging exterior surfaces, and means for supplying films of molten glass to the upper portions of said surfaces.

37. In an apparatus of the class described, a member down opposite sides of which molten glass is intended to flow in film form, and means for directing a broad stream of molten glass onto the upper end of the member in such a way that the glass is caused to flow down the opposite sides thereof.

38. In an apparatus for producing sheet glass, a member having opposite surfaces merging in a line at the bottom of the member, and means for supplying films of molten glass to an upper portion of said surfaces.

39. In an apparatus for producing sheet glass, a wedge shaped member with its apex downward, and means for supplying molten glass to the upper end of the member so that it will flow down both sides thereof.

40. The method of forming sheet glass, consisting in causing molten glass to flow in laterally divided streams down a directing means and in merged single sheet form therefrom.

41. In an apparatus for producing sheet glass, means having downwardly converging surfaces, and means for supplying films of molten glass to said surfaces to flow down portions of the same and in merged single sheet form from the lower ends thereof.

In testimony whereof I have hereunto signed my name to this specification.

EDWARD DANNER.